(12) United States Patent
Olson et al.

(10) Patent No.: US 7,480,710 B1
(45) Date of Patent: Jan. 20, 2009

(54) RESOLVING DUPLICATION OF IP ADDRESSES IN IP NETWORKS

(75) Inventors: Keith Olson, San Diego, CA (US); Dandi Jo Holec, San Diego, CA (US); Ed Van Horne, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 10/890,052

(22) Filed: Jul. 13, 2004

(51) Int. Cl.
*G06F 15/16* (2006.01)

(52) U.S. Cl. ...................................... 709/223

(58) Field of Classification Search ................ 709/223, 709/221, 235; 370/235
See application file for complete search history.

(56) References Cited

U.S. PATENT DOCUMENTS

2004/0215752 A1 * 10/2004 Satapati et al. .............. 709/223

OTHER PUBLICATIONS

Cisco Systems, Inc., "Cisco Service Selection Gateway", Copyright © 1992-2001, 3 pages.

* cited by examiner

*Primary Examiner*—Jason D Cardone
*Assistant Examiner*—Adnan Mirza
(74) *Attorney, Agent, or Firm*—Trellis IP Law Group, PC (57) ABSTRACT

A routing module resolves the conflict of IP addresses among at least two devices connected over a network. The routing module assigns a global IP address to a device based on the addressing configuration of the device. The outbound packets are sent with this global IP address. A record of the global IP address assigned to the device, the local IP address and MAC address are maintained by an information module. Where the local IP address of two or more devices is the same, the MAC address is used to determine the appropriate destination device. Routing module determines the entry in the information module that corresponds to the global IP address included within the IP header of inbound packets. The inbound packets are sent to the local IP address and MAC address of the appropriate destination-device that is derived from the entry that corresponds to the global IP address.

20 Claims, 8 Drawing Sheets

RESOLVING DUPLICATION OF IP ADDRESSES IN IP NETWORKS

BACKGROUND OF THE INVENTION

1. Field of Invention

The present invention relates, in general, to the field of networks (e.g., the Internet). More specifically, embodiments of the present invention relate to systems and methods for interfacing devices of a private network with a public network.

2. Description of Background Art

The Internet Protocol (IP) is a set of rules that defines how computers and other digital devices communicate over networks, such as private networks and the Internet. IP is commonly employed to route information from one device to another device in a network. For this purpose, a unique IP address is assigned to each of the devices, which serves as an identification for the device and ensures that data meant for a particular device is not routed to another device.

Generally, IP addresses can be assigned either statically or dynamically to the devices in a network. In a static assignment of IP addresses, once a device has been assigned an IP address, the IP address of the device is fixed and it is not changed. In the case of a dynamic assignment of IP addresses, a central server assigns an IP address is temporarily to the device. The dynamic assignment of an IP address is implemented by using a protocol called the Dynamic Host Configuration Protocol (DHCP). DHCP works by having a client device that needs an IP address send a message over the network. A DHCP server responds by offering an available IP address. Usually, both the static and dynamic assignment of IP addresses is implemented in a network. Specific network administration and control is required in such cases, to ensure that the assignment of an IP address does not lead to any duplication of IP addresses, and network disruptions can be avoided.

However, in the case of a Public Access LAN (PAL) environment, access to the Internet is provided in public environments, such as in hotels, at airports, and in coffee shops and so forth. In most, if not all such networks, there is no administrative control of the configuration of the network devices. In a PAL, a user may freely configure the network settings. As a result, the user may choose to assign a static IP address to a device, or obtain an IP address dynamically from a DHCP server in the PAL. Therefore, it is possible that a device statically configured by the user could have the same IP address as another dynamically configured device, or a statically configured device on the same PAL.

From the foregoing discussion, it is apparent that duplication of IP addresses in a PAL may occur due to non-administered configurations of the network devices. In such a scenario, devices with a same IP address are prone to interfere with each other's network communications in the absence of specific support to deal with such a scenario.

SUMMARY OF THE EMBODIMENTS OF THE INVENTION

Embodiments of the present invention provide a method, a system and a computer-program product for interfacing devices connected over a private network with a public network. Embodiments of the present invention route packets between a private network and a public network, while addressing a scenario where two or more devices in the private network have the same Internet protocol (IP) address. The combination of the IP address and the media access control (MAC) address corresponding to a device in the network is used to determine the appropriate destination device for which the communications are meant. The MAC address, which is unique to every device, is employed to determine the appropriate destination device in the scenario where two or more devices in the network have the same IP address.

In accordance with an embodiment of the invention, a router includes a routing module, which implements the logic to process the packets in the network. The routing module assigns a global IP address to each device based on the type of the addressing configuration of the device. For devices configured with a static IP address, a global IP address, which is distinct from the local static IP address of the device, is assigned. On the other hand, for dynamically configured devices, the local DHCP address itself is assigned as the global IP address for the device. The router comprises an information module that maintains a record of the assigned global IP address and the combination of the local IP address and the unique MAC address of a device. Packets outbound from a device are sent with the global IP address of the device as the local IP address. For packets outbound from statically configured devices, the packets are sent with Network Address Translation which is carried out by a Network Address Translation module within the router. In an embodiment of the present invention, the Network Translation module may be configured separately from the router.

In the case of inbound packets, the routing module maps the global IP address (included within the header information of inbound packets in the 'destination IP address' field) with the global IP addresses recorded with the information module. Inbound packets are routed to the appropriate device by the router in accordance with the mapping of the global IP address, the local IP address and the unique MAC address corresponding to a device.

In another embodiment of the present invention, the conflict of IP address is resolved between at least two devices connected over a network. The local IP addresses and the unique MAC addresses of the devices in the network are determined. A global IP address is assigned to each static IP device. The assigned global IP address is associated with the combination of the local IP address and the unique MAC address corresponding to a device by maintaining an entry in the client table. A record of the assigned global IP address, the corresponding local IP address and the unique MAC address for each of the devices is maintained. The duplication of IP addresses between two or more devices in the network is resolved based on the mapping of the global IP address with the combination of the local IP address and the unique MAC address.

DETAILED DESCRIPTION OF EMBODIMENTS OF THE INVENTION

Embodiments of the present invention include a method, a system and a computer-program product for interfacing devices connected over a private network with a public network. Embodiments of the present invention further include a method, a system and a computer-program product that resolves the conflict of IP addresses among multiple devices connected over a private network. Hence, packets may be routed to the appropriate device (for which the packets are meant) even if multiple devices connected over the network have the same IP address.

Figure 1:
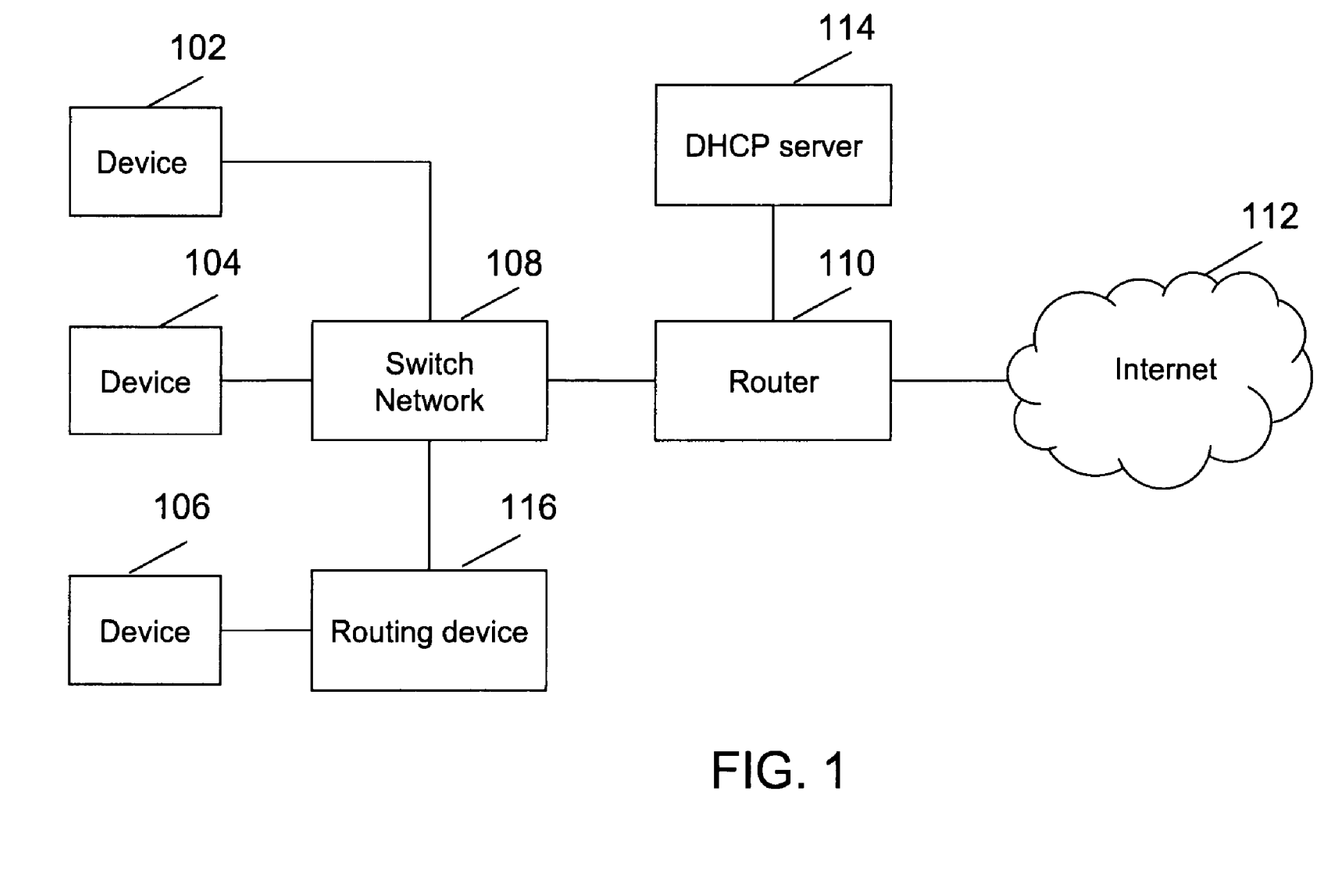
FIG. 1 is a block diagram of an exemplary network environment in which embodiments of the present invention may be implemented.

FIG. 1 is a block diagram of an exemplary network environment in which embodiments of the present invention may be implemented. Device 102, device 104 and device 106 are connected through a private network such as a Local Area Network (LAN), a Wide Area Network (WAN), and the like. The private network may be a wired or a wireless network. Devices 102, 104 and 106 may be any computing or data processing device, such as a computer, PDA, and the like. Device 102, 104 and 106 may have statically assigned addresses or dynamically assigned addresses.

Device 102 and device 104 are connected through a switch network 108. In accordance with an embodiment of the present invention, switch network 108 may be configured for port-to-port security so that packets originating from a given device are not visible to devices on other switch ports. In an embodiment, switch network 108 may be any suitable switch network, such as a switch network manufactured by Cisco Systems Inc. Networking software running on a device often disables network communications if the software detects another device with the same IP address in the network. Hence, the port-to-port security configuration of switch network 108 prevents network disruptions by obstructing devices from detecting other devices with the same IP address.

As illustrated in the exemplary network configuration in FIG. 1, switch network 108 is connected to a router 110. Router 110 routes packets to and from devices to a public network 112, such as the Internet. Router 110 resolves the conflict of IP addresses in a scenario where two or more devices with the same IP address attempt to connect to public network 112. In such a scenario, router 110 translates the local IP address of the outbound packets into a global IP address that facilitates the transmission of the outbound packets over public network 112. A local IP address is the address originally assigned to a device, either statically or dynamically. On the other hand, the global IP address is an address assigned by router 110 to a device, to correspond to the combination of the local IP address and the MAC address of the device.

In the case of inbound packets received by router 110, it identifies the appropriate destination device to which the packets are to be routed. The component modules and the functioning of router 110 have been described in detail in conjunction with FIG. 2.

The private network includes a Dynamic Host Configuration Protocol (DHCP) server 114, which is coupled to router 110. DHCP server 114 may dynamically assign public addresses or private IP addresses to the devices on the private network. Device 106 is connected to a routing device 116 that routes packets to and from client 106 and connects to switch network 108. It is to be understood that a transmission to a public IP would go straight to the Internet 112, whereas a transmission to a private IP would be sent to another router (not shown) within the Internet 112 that would make an appropriate translation to convert the private IP into a public IP.

Figure 2:
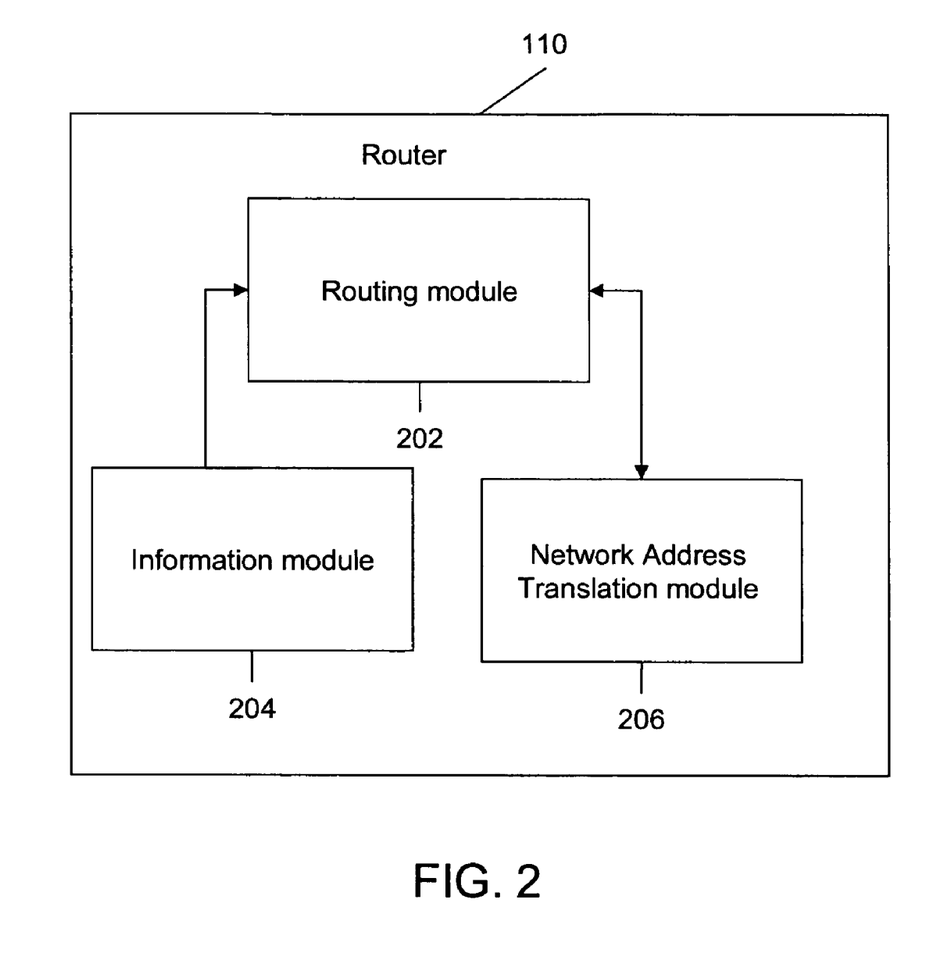
FIG. 2 is a block diagram of the components of a router, in accordance with embodiments of the present invention.

FIG. 2 illustrates the components of router 110, in accordance with an embodiment of the present invention. Router 110 comprises a routing module 202, an information module 204 and a network address translation module 206. Routing module 202 includes the logic for resolving the conflict of IP addresses. Information module 204 maintains a record of the addressing information of the devices connected over the private network. Network address translation module 206 carries out network address translation on packets to and from all statically configured devices in the private network.

Routing module 202 makes use of the information comprised in information module 204, to identify the appropriate device to which the packets received by router 110 are to be routed. Information module 204 maintains a dynamic IP address table and a client table comprising the addressing information of devices connected over a private network. The addressing information included within information module 204 is illustrated in detail in conjunction with FIG. 3.

Various scenarios of the conflict of IP address may be resolved by embodiments of the present invention. In one exemplary scenario, the IP address of two statically configured clients may be the same. For instance, device A and device B may both have the statically configured IP address 10.10.10.10. In another instance, device C may be dynamically configured with a private address 10.10.10.10 that has been assigned by a DHCP server. On the other hand, device D may be statically configured with the same private address 10.10.10.10. In all such scenarios, routing module 202 routes packets to and from the devices based on the type of addressing configuration of the device.

Routing module 202 transmits outbound packets in the manner described hereinafter. For statically configured devices, routing module 202 assigns a global IP address, which is distinct from the local IP address statically assigned to the device. The global IP address may be a public address or a private address. The global IP address is used to carry out network address translation on the packets originating from the statically configured device, to facilitate communication of the device with public network 112. Routing module 202 sets the global source IP address on the outbound packets originating from a statically configured device, and sends these to the destination device on public network 112. This address conversion is accomplished by Network Address Translation module 206.

For dynamically configured devices, routing module 202 assigns, preferably dynamically assigns, the local IP address as the global IP address of the device. Again, the global IP address in this case may also be a public address or a private one. For outbound packets originating from a dynamically configured device, routing module 202 marks the packets with the global IP address (which is the same as the local IP address) and sends these packets to the destination device on public network 112.

Similarly, upon the receipt of inbound packets, routing module 202 checks whether the destination IP address in the packet header matches a global IP address listed with information module 204. In case the global IP address in the packet header matches any of the global IP addresses listed with information module 204, routing module 202 determines the type of addressing configuration of the device corresponding to the global IP address. If the device has a static addressing configuration, network address translation is applied to send the packets to the appropriate device. Network address translation performed on the packets involves converting the assigned destination global IP address into the local IP address of the statically configured device. In addition the destination MAC address is set to that of device 102 or 104 in the intervening routing device 116.

Even though the local IP address listed in the client table may be same for two or more devices, the global IP address corresponding to the device is unique. Based on the global destination IP address, the appropriate device can be determined in case of inbound packets meant for a statically configured device. Routing module 202 locates the appropriate table entry for the device and determines the correct local IP and MAC addresses for the device.

In the case in which the addressing configuration of the device that corresponds to the global IP address is dynamic, the inbound packets are directly sent to the device (without carrying out network address translation) that has the specific global IP address in the network. For dynamically configured devices, the global destination IP address is the same as the local IP address. Routing module 202 locates the appropriate table entry for the device and determines the correct MAC address for the device.

Figure 3:
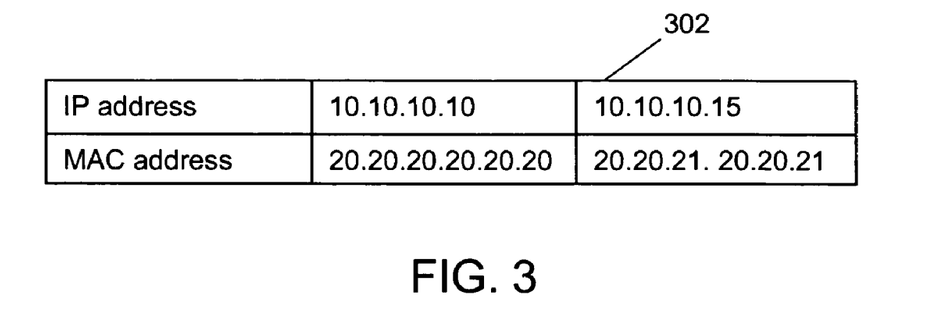
FIG. 3 illustrates a dynamic IP address table maintained by an information module, in accordance with embodiments of the present invention.

FIG. 3 illustrates a dynamic IP address table 302 in accordance with an embodiment of the present invention. Dynamic IP address table 302 is maintained by information module 204 and comprises the addressing information of all dynamically configured devices in the network. In particular, dynamic IP address table 302 comprises the MAC address and the local IP address information of each of the dynamically configured devices. For example, in FIG. 3, dynamic IP address table 302 comprises the MAC address and the IP address of two active dynamically configured devices. Embodiments of the present invention provide for the updating of dynamic IP address table 302 periodically as well as in real-time depending on the requirements of the network. Information module 202 sniffs or inspects the packets to and from DHCP server 114 in order to populate and update dynamic IP address table.

Figure 4:
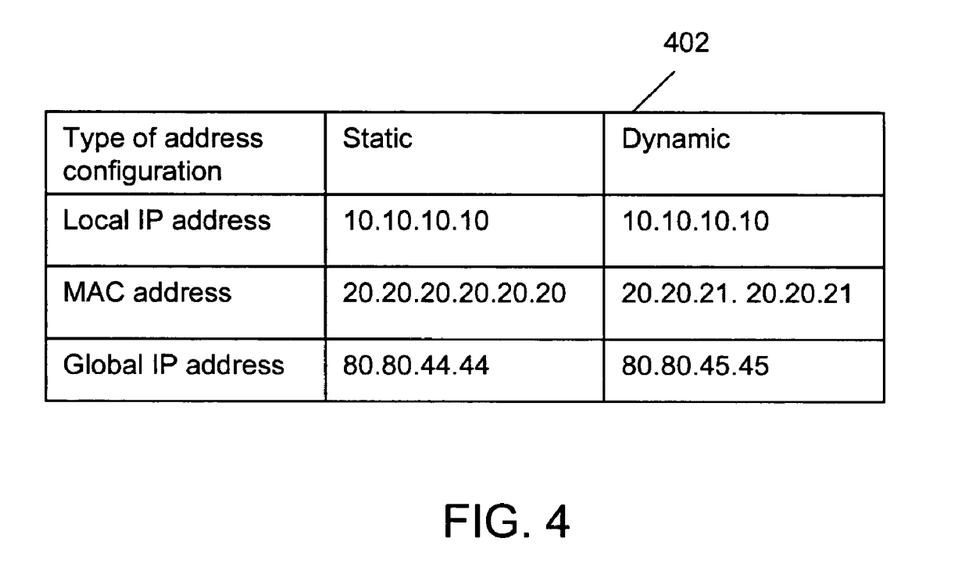
FIG. 4 illustrates a client table maintained by the information module, in accordance with embodiments of the present invention.

FIG. 4 illustrates a client table 402 maintained by information module 204, in accordance with an embodiment of the present invention. Client table 402 comprises the addressing information of all the devices active in the private network. The type of the addressing information that is maintained for a given device in client table 402 is dependent on the type of the addressing configuration of a device.

In the case of the devices having their local IP addresses configured statically, client table 402 comprises 'fields' for the local IP address, the MAC address, the global IP address, and the type of IP addressing configuration. The 'local IP address' field contains the statically assigned IP address of the device. The static IP address may be a public address or a private address. The 'MAC IP address' field contains the unique MAC address of the device. The 'global IP address' field contains the global IP address assigned to the statically configured device by routing module 202. The 'type of addressing configuration' field contains that the device has a 'static' IP address configuration.

In the case of dynamically configured devices, client table 402 comprises 'fields' for the MAC address, the global IP address and the type of IP addressing configuration. In accordance with an embodiment of the present invention, and also in the case of dynamically configured devices, it is redundant to maintain a 'local IP address' field in client table 402 because of the following two reasons. Firstly, the 'local IP address' field is already maintained in the dynamic IP address table. Secondly, the global IP address assigned by routing module 202 to a dynamically configured device is the local IP address of the device. This information is not maintained in the client table since, unlike the case of statically configured devices, the mapping of the global IP address of the inbound packets, with the local IP address, is not required to determine the appropriate device. In the case of dynamically configured devices, the inbound packet is simply directed to the device having the global IP address (which is the local IP address) and the MAC address without any need for network address translation.

Figure 5:
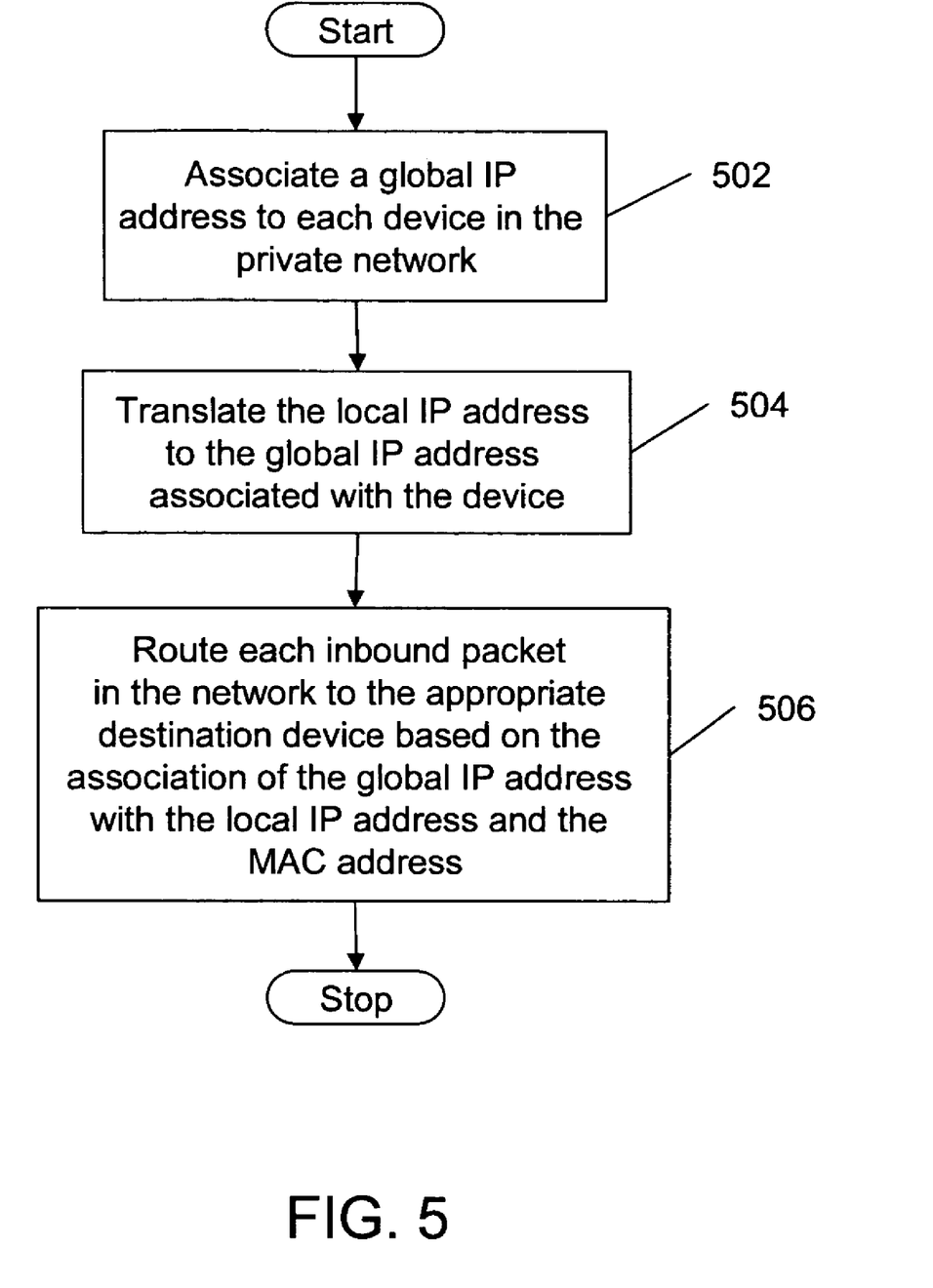
FIG. 5 is a flowchart of a method in accordance with embodiments of the present invention of interfacing devices connected over a private network with a public network.

FIG. 5 is a flowchart of a method of interfacing devices connected over a private network with a public network, in accordance with an embodiment of the present invention. At step 502, a global IP address is associated with each device in a private network. The association of the IP address is carried out by mapping the global IP address to the combination of the local IP address and the MAC address of the device. In an exemplary embodiment, for a given device A, the assigned global IP address is associated in client table 402, by listing it as corresponding to the MAC address and the local IP address of device A. The global IP address is representative of a device for purposes of communication with public networks.

At step 504, for each outbound packet from a device, the local IP address and the MAC address are translated to the global IP address associated with the device. In accordance with an embodiment of the present invention, the translation of the local IP address to the global IP address is carried out based on the type of IP address configuration of the device. For instance, in the case of statically configured devices, the local IP address is translated by network address translation module 206 for purposes of communicating outbound packets to public network 112. For dynamically configured devices, the outbound packets are sent 'as it is' with the local IP address assigned as the global IP address. In an embodiment of the present invention, network address translation may be carried out for such packets on the public network side of router 110. At step 506, each inbound packet in the network is routed to the appropriate destination device in the private network. Routing module 202 routes the packets to the destination device based on the association of the global IP address with the local IP address and the MAC address corresponding to a device. The routing of packets by routing module 202 in accordance with an embodiment of the present invention has been previously described in conjunction with FIG. 2.

Figure 6:
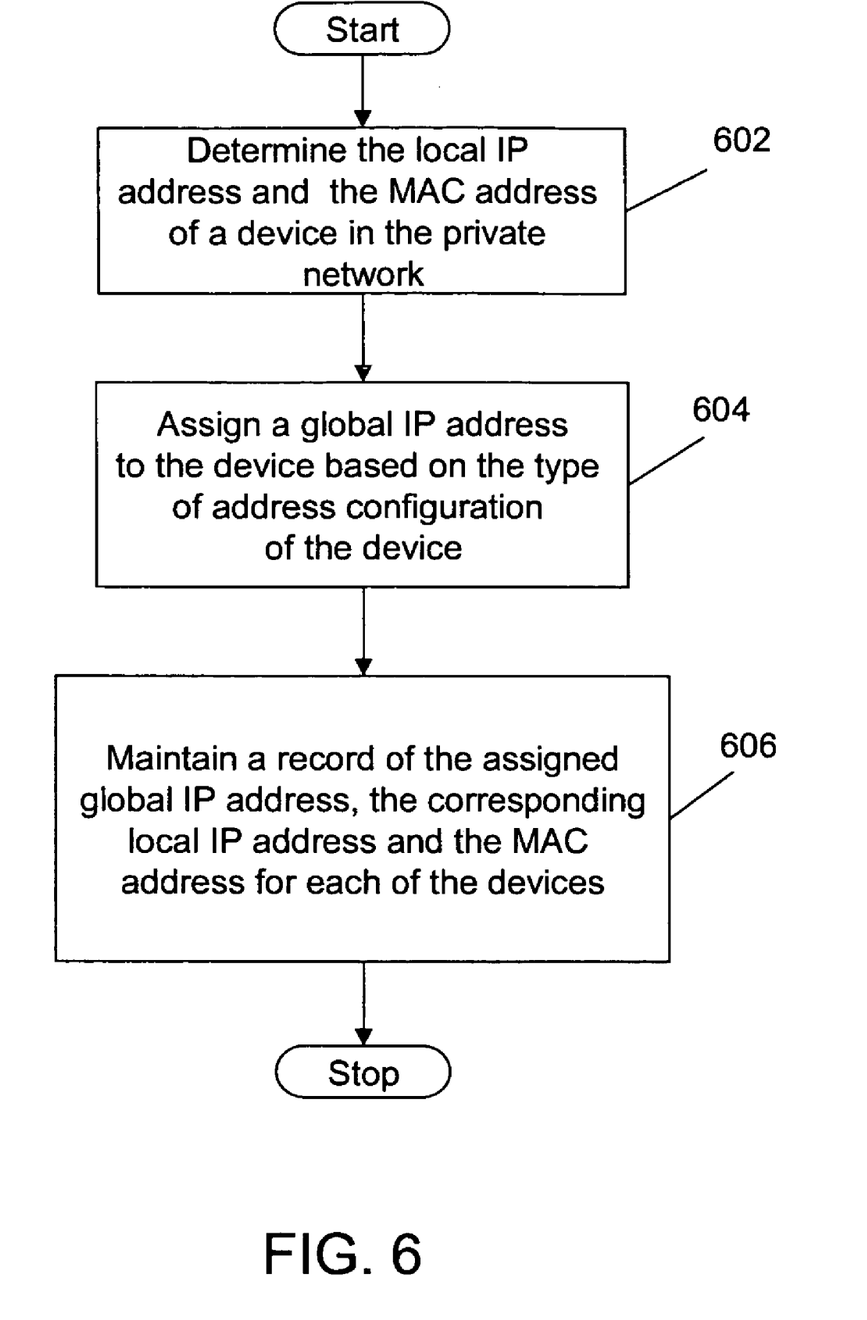
FIG. 6 is a flowchart of a method in accordance with embodiments of the present invention of associating a global IP address to each device in the network.

FIG. 6 is a flowchart of a method to associate a global IP address with each device in the private network, in accordance with an embodiment of the present invention. At step 602, the local IP address and the MAC address of a device in the private network is determined. At step 604, a global IP address is assigned to the device based on the type of address configuration of each device. In case of a statically configured device, a global IP address that is distinct from the local IP address of a given device is assigned to the device. On the other hand, in case of a dynamically configured device, the local IP address is assigned as the global IP address of the device. At step 606, a record of the assigned global IP address, the corresponding local IP address and the MAC address for each of the devices is maintained. This record is maintained and updated by information module 202 by means of dynamic IP address table 302 and client table 402.

Figure 7:
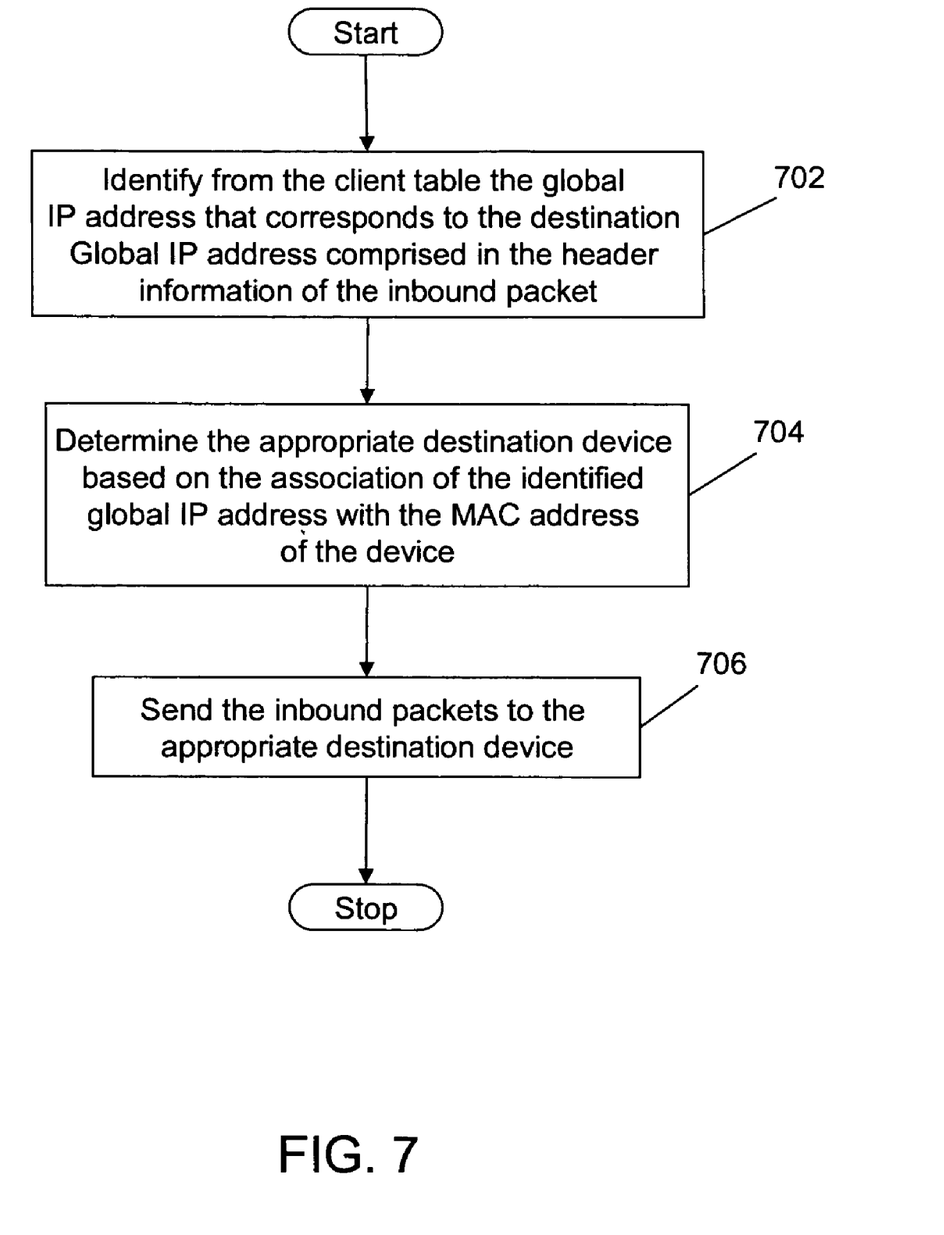
FIG. 7 is a flowchart of a method in accordance with embodiments of the present invention of routing each inbound packet in the network to the appropriate destination device.

FIG. 7 is a flowchart of a method of routing each inbound packet in a network to the appropriate destination device (irrespective of the existence of multiple devices with the same local IP address in the network). At step 702, the global IP address, that corresponds to the global IP address included within the header information of the inbound packet, is identified from client table 402. The address configuration of the device corresponding to the identified global IP address is also determined from the entry in the client table that corresponds to the identified global IP address. At step 704, the appropriate destination device is determined based on the association of the identified global IP address with the combination of the local IP address and the MAC address of the device. At step 706, the inbound packets are sent to the appropriate destination device. In the case of a statically configured device, the local IP address and the MAC address listed against the identified global IP address point to the appropriate destination device. In such case, the packets are sent to the appropriate local IP address and MAC address after carrying out network address translation. In case of a dynamically configured device, the packet is directly sent to the global IP address (which is the local IP address of a dynamically configured device in the private network).

Figure 8:
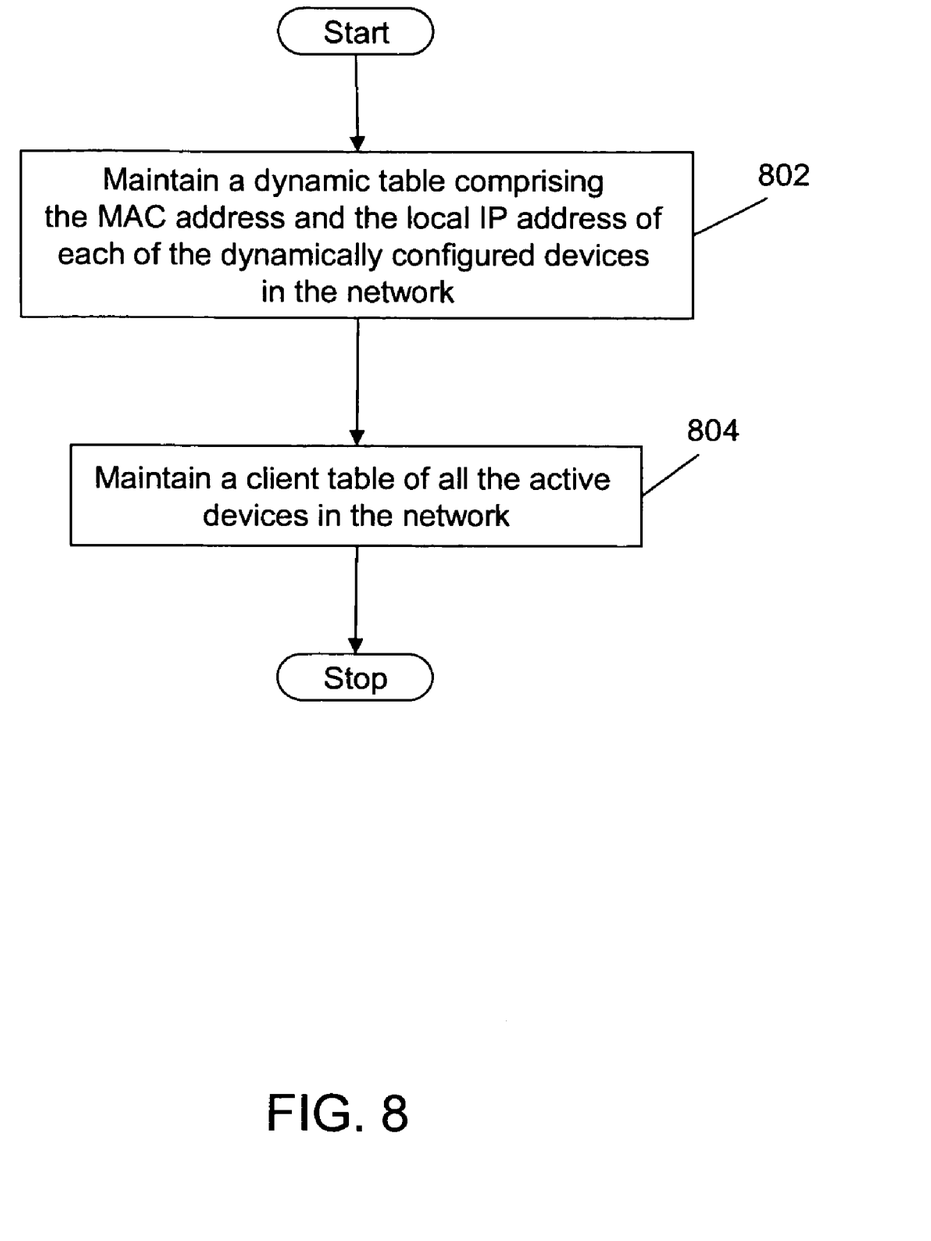
FIG. 8 is a flowchart of a method in accordance with embodiments of the present invention of maintaining a record of the assigned global IP addresses, the MAC addresses, and the local IP addresses.

FIG. 8 is a flowchart of a method in accordance with an embodiment of the present invention of maintaining a record of the assigned global IP addresses, the MAC addresses and the local IP addresses. At step 802, a dynamic IP address table comprising the MAC address and the local IP address of each of the dynamically configured devices in the network is maintained. At step 804, a client table of all the active devices in the network is maintained. In accordance with an embodiment of the invention, the client table comprises information identifying the type of address configuration, the MAC addresses, and the global IP address of each of the active clients in the network. For each of the statically configured devices in the network, along with the information described in step 802, the local IP address of each of the active clients is also maintained. In an embodiment of the present invention, the client table and the dynamic IP address table are updated by information module 204 in real time, i.e., as and when there is change in the addressing information of the devices or in the network. For instance, the client table and the dynamic IP address table may be updated upon a change in the addressing of a device, or the addition/deletion of a device from the private network. In another embodiment, the tables are periodically updated.

Figure 9:
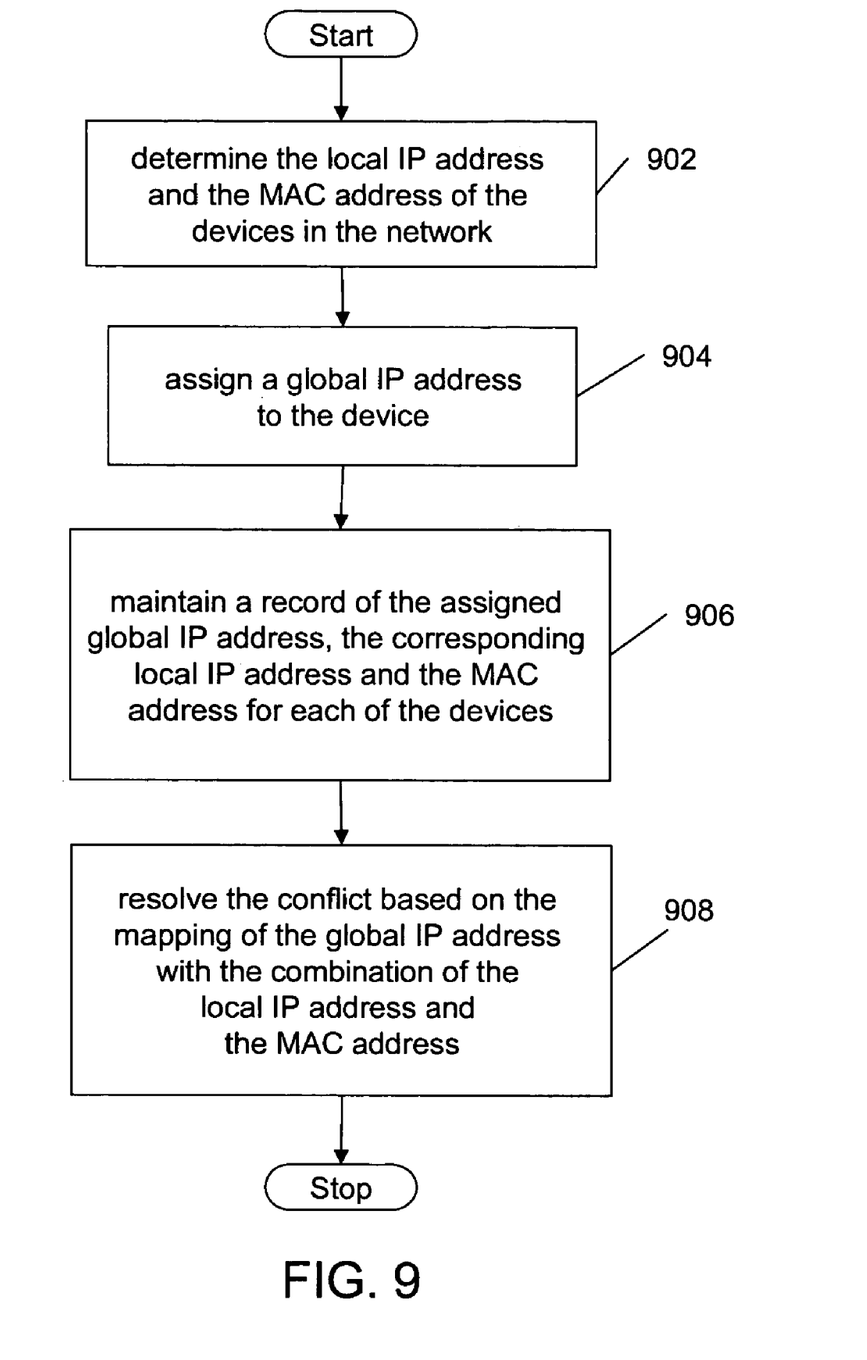
FIG. 9 is a flowchart of a method of resolving the conflict of IP address between at least two devices connected over a network, in accordance with embodiments of the present invention.

FIG. 9 is a flowchart of a method in accordance with an embodiment of the present invention of resolving the conflict of IP address between at least two devices connected over a network. At step 902, the local IP address and the MAC address of the devices in the network is determined. At step 904, a global IP address is assigned to the devices. The assigned global IP address is associated with the combination of the local IP address and the MAC address, corresponding to a device, by maintaining an entry in the client table. The global IP address identifies the device in terms of the combination of the local IP address and the MAC address of the device. At step 906, a record of the assigned global IP address, the corresponding local IP address and the MAC address for each of the devices is maintained in the client table. At step 908, the duplication of IP addresses between two or more devices in the network is resolved based on the mapping of the global IP address with the combination of the local IP address and the MAC address.

The implementation of embodiments of the present invention in certain exemplary scenarios is hereinafter described to illustrate the scope of the invention. Referring again to FIG. 1 and to FIG. 2, in an exemplary scenario, Device 102 and Device 104 may both be configured with the same static IP address. The outbound packets originating from Device 102 and Device 104 are sent to router 110. The steps described hereinafter may be followed, in accordance with an embodiment of the present invention, to process the packets originating from these statically configured devices with the same local IP address.

Routing module 202 checks the dynamic IP address table maintained by information module 204, to determine whether the local IP address and the MAC IP address of the packets (originating from device 102 and from device 104) is listed in the dynamic IP address table. If the local IP address and the MAC address do not match any entry in the dynamic IP address table, it is determined that the device from which the packets originate, is a statically configured device.

Thereupon, routing module 202 checks the client table maintained by information module 204 to determine whether the local IP address and the MAC address of the statically configured devices 102 and 104 are listed in the client table. If the local IP address and the MAC address do not match any entry in the client table, an entry is created in the client table corresponding to device 102 and device 104. The local IP address, the MAC address and the type of address configuration (static) corresponding to devices 102 and 104 are listed in the client table.

Routing module 202 assigns a global IP address (for example, X) to device 102 and this global IP address is recorded against the global IP address field for device 102 in the client table. The global IP address for device 104 is also listed in the client table, upon the assignment of a global IP address (Y) to device 104. Network address translation module 206 sends the outbound packets from device 102 with the global IP address X to public network 112. Similarly, network address translation module 206 sends packets from device 104 with the global IP address Y to public network 112.

In the case when inbound packets are received by routing module 202, the following steps may be followed, in accordance with an embodiment of the present invention, for the purpose of determining the appropriate destination device to which the inbound packets are to be routed.

Routing module 202 checks the client table to determine, whether the destination global IP address X comprised in the header information of the inbound packets, matches with a global IP address of an entry of the client table. In case the global IP address X is listed in the client table, the entry corresponding to this global IP address is obtained from the client table. This entry corresponds to device 102. The type of IP address configuration of device 102 is determined from the 'type of address configuration' field. In this case, device 102 has a static IP address configuration. The packets are routed by network address translation module 206 to the local IP address and MAC address corresponding to device 102, based on the MAC address corresponding to device 102. In this manner, although the local IP address of both device 102 and 104 are the same, routing module 202 resolves the conflict of IP addresses with the help of the global IP address, the MAC address and the local IP address fields corresponding to a device.

Referring again to FIG. 1, in yet another exemplary illustration of an embodiment of the present invention, it may be assumed that device 102 has a dynamically assigned IP address (X, which, in effect is the local IP address) that is the same as the statically configured IP address (X) of device 104. In this scenario, in accordance with an embodiment of the present invention, outbound packets from device 102 are assigned the local IP address X as the global IP address and routed to the public network. Outbound packets from device 104 are assigned a global IP address (Y), which is distinct from the local IP address of device 104 (X). These packets are sent to public network 112 after carrying out network address translation. In this case, the combination of the global IP address (X), the local IP address (X) and the unique MAC address corresponding to dynamically configured device 102 is different from the combination of the global IP address (Y), the local IP address (X) and the unique MAC address corresponding to statically configured device 104. Therefore, inbound packets having the global IP address X can be sent to dynamically configured device 104 at the local IP address X (which is also the local IP address of device 104). The inbound packets having the local IP address Y are routed to device 104 having the local IP address X based on the MAC address corresponding to the local IP address. Thus, embodiments of the present invention can effectively distinguish between devices in case of a duplication of local IP addresses and route communications appropriately.

In yet another exemplary scenario, the local IP address of dynamically configured device 106 may be the same as the local IP address of statically configured device 104. In this case, in accordance with an embodiment of the present invention, the MAC address of outbound packets from device 106 is the switch-facing MAC address of router 110 and not device 106. Even in this scenario, the duplicity of local IP addresses can be resolved, as the MAC and local IP address combination of router 110 is different from the MAC and local IP address combination of device 104.

An exemplary pseudo code that may be executed to carry out a method in accordance with embodiments of the present invention is given below:

For processing outbound packets originating from the devices:

If the packet local IP addresses MAC address do not match any entry in dynamic IP address table Device has a static IP End if If packet local IP addresses and MAC address do not match any entry in client table Create an entry in client table for the device If device has a static IP Assign global IP address for device (for NAT)

End if

Else

Get entry for device from client table

End if

If device has a static IP

Send packet with NAT

Else

Send packet

End if

For processing inbound packets by the Router

If packet destination IP address matches global IP Address of an entry in client table Get client table entry for device If device is static IP Send packet to device with NAT Else Send packet to device End if End if In accordance with an embodiment of the present invention, various modules and devices described herein may be implemented in a software or hardware or as a combination of the two. For instance, routing module may be implemented as software embedded in hardware. The software may comprise program instruction means for resolving the conflict of IP addresses. The network address translation module may be implemented as a data structure that stores the address translation performed on the packets. The dynamic IP address table and the client table may be implemented in the form of any data structure.

Although the invention has been discussed with respect to specific embodiments thereof, these embodiments are merely illustrative, and not restrictive, of the invention. For example, a "DHCP server" can include any type of analysis, manual or automatic, to anticipate the needs of assigning addresses to the devices on a private network at a time of network operation. A switch can be any type of switch that enables port-to-port security. Network address translation can include any method or procedure for mapping one set of IP addresses to another including port address translation.

Although specific protocols have been used to describe embodiments, other embodiments can use other transmission protocols or standards. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program local code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of interfacing devices of a private network with a public network, wherein the devices communicate with each other, and each device has a local Internet protocol (IP) address and a unique media access control (MAC) address, the method comprising:

determining whether the local IP address for each device in the private network is dynamically or statically configured, wherein the local IP address is the same for each of at least two devices in the private network when at least one of the devices is determined to be statically configured;

associating a global IP address to each device in the private network by mapping the global IP address to the local IP address and the unique MAC address of each device, the global IP address being the same as the local IP address when the local IP address is determined to be dynamically configured, the global IP address being distinct from the local IP address when the local IP address is determined to be statically configured;

translating for each outbound packet from each device, the local IP address to the global IP address associated with each device, each outbound packet traveling from the private network to the public network, wherein network address translation is used for translating the local IP address to the global IP address when the local IP address is determined to be statically configured; and routing each inbound packet in the private network to an appropriate destination device based on the association of the global IP address with the local IP address and the unique MAC address corresponding to the appropriate destination device, each inbound packet traveling from the public network to the private network, wherein network address translation is used for converting the global IP address to the local IP address for routing to the appropriate destination device when the local IP address is determined to be statically configured.

2. The method of claim 1, wherein the associating the global IP address to each device in the private network comprises:

determining the local IP address and the unique MAC address of each device in the private network;

assigning a global IP address to each device based on the determination of the statically or dynamically configured local IP address of each device; and maintaining a record of the assigned global IP address, the corresponding local IP address, and the unique MAC address for each of the devices.

3. The method of claim 1, wherein the translating the local IP address to the global IP address comprises translating the local IP address to the global IP address based on the determination of the statically or dynamically configured local IP address of each device.

4. The method of claim 3, wherein when the devices are determined to be statically configured, the translating the local IP address to the global IP address further comprises sending the outbound packet with network address translation to the public network.

5. The method of claim 3, wherein when the devices are determined to be dynamically configured, the translating the local IP address to the global IP address further comprises sending the outbound packet to the public network with the local IP address.

6. The method of claim 1, wherein the routing each inbound packet in the private network to the appropriate destination device comprises:

identifying from a maintained record the global IP address that corresponds to the global IP address included in the IP header information of the inbound packet;

determining the appropriate destination device based on an association of the identified global IP address with the unique MAC address of the appropriate destination device; and sending the inbound packet to the appropriate destination device.

7. The method of claim 6, wherein when the appropriate destination device is determined to be statically configured, the routing the inbound packets comprises sending the inbound packet with network address translation.

8. The method of claim 2, wherein the assigning the global IP address for a device determined to be dynamically configured comprises assigning the local IP address as the global IP address.

9. The method of claim 2, wherein the maintaining the record of the assigned global IP addresses, the unique MAC addresses, and the local IP addresses of the devices comprises:

maintaining a dynamic IP address table including the unique MAC address and the local IP address of each device determined to be dynamically configured in the private network; and maintaining a client table of each device in the private network, the client table comprising information identifying a determined static or dynamic type of address configuration, the unique MAC address, and the global IP address of each active client in the private network.

10. The method of claim 9, wherein the maintaining the client table further comprises maintaining the local IP address of each of the active clients determined to have statically configured IP addresses.

11. The method of claim 6, wherein the identifying the global IP address that corresponds to the global IP address in the header information of the inbound packet comprises:

determining the destination IP address in the header information of an inbound packet;

comparing the destination IP address with the global IP addresses listed in a client table; and selecting the global IP address that matches the destination IP address.

12. A method of resolving an Internet protocol (IP) address conflict between at least two devices connected over a private network, wherein the IP address conflict involves duplication of an IP address between the at least two devices, the method comprising:

determining a local IP address and a media access control (MAC) address of each device in the network;

determining whether the local IP address for each device in the private network is dynamically or statically configured, wherein the at least two devices having an IP address conflict include a device having a local IP address determined to be statically configured;

assigning a global IP address to each device, the assignment associating the global IP address with a combination of the local IP address and the MAC address of each device, the global IP address being the same as the local IP address when the local IP address is determined to be dynamically configured, the global IP address being distinct from the local IP address when the local IP address is determined to be statically configured;

maintaining a record of the assigned global IP address, a corresponding local IP address, and the MAC address, for each device; and resolving the IP address conflict based on a mapping of the global IP address with the combination of the local IP address and the MAC address.

13. A system adapted to resolve an Internet protocol (IP) address conflict between at least two devices connected over a private network, the system comprising:

a switch configured for port to port security and connected to the at least two devices, and adapted to prevent disruptions in network communications;

an address type determination module for determining whether the local IP address for each device in the private network is dynamically or statically configured, wherein the at least two devices having an IP address conflict include a device determined to be statically configured;

an address assignment module for assigning a global IP address to each device, the assignment associating the global IP address with a combination of the local IP address and a media access control (MAC) address of each device, the global IP address being the same as the local IP address when the local IP address is determined to be dynamically configured, the global IP address being distinct from the local IP address when the local IP address is determined to be statically configured;

a routing module coupled to the switch for resolving the IP address conflict between the at least two devices based on the MAC address information of each device; and an information module coupled to the routing module and providing the MAC address information to the routing module.

14. The system of claim 13, wherein the information module comprises a dynamic IP address table including a MAC address and a local IP address of each device determined to be dynamically configured in the network, the information module having a client table comprising the MAC address and addressing information of each active device in the network.

15. The system of claim 13, further comprising a network address translation module for sending packets from the private network to a public network.

16. An apparatus for resolving a local Internet protocol (IP) address conflict between at least two devices connected over a private network, wherein the local IP address conflict includes duplication of a local IP address between at least two devices, the apparatus comprising:

a processor; and logic encoded in one or more tangible media for execution by the processor, and when executed operable to:

determine the local IP address and a media access control (MAC) address of the at least two devices in the network;

determine whether the local IP address for each device in the private network is dynamically or statically configured, wherein the at least two devices having an IP address conflict include a device having a local IP address determined to be statically configured;

assign a global IP address to each device including associating the global IP address with a combination of the local IP address and the MAC address of the device, the global IP address being the same as the local IP address when the local IP address is determined to be dynamically configured, the global IP address being distinct from the local IP address when the local IP address is determined to be statically configured;

maintain a record of the assigned global IP address, a corresponding local IP address, and the MAC address, for each of the devices; and resolve the local IP address conflict based on a mapping of the global IP address with the combination of the local IP address and the MAC address.

17. A computer-readable storage device, comprising:

one or more instructions for determining a local Internet protocol (IP) address and a media access control (MAC) address of devices in a private network;

one or more instructions for determining whether the local IP address for each device in the private network is dynamically or statically configured, wherein at least two devices having an IP address conflict include a device having a local IP address determined to be statically configured;

one or more instructions for assigning a global IP address to each network device including associating the global IP address with a combination of the local IP address and the MAC address of each network device, the global IP address being the same as the local IP address when the local IP address is determined to be dynamically configured, the global IP address being distinct from the local IP address when the local IP address is determined to be statically configured;

one or more instructions for maintaining a record of the assigned global IP address, a corresponding local IP address, and the MAC address, for each of the devices; and one or more instructions for resolving the IP address conflict based on a mapping of the global IP address with the combination of the local IP address and the MAC address.

18. The method of claim 12, wherein the private network interfaces with a public network during communication with the at least two devices.

19. The method of claim 12, wherein the MAC address comprises a unique physical address for each device in the private network.

20. The method of claim 12, wherein the maintaining the record comprises using a client table.

* * * * *